United States Patent
Liu

(10) Patent No.: US 12,445,978 B2
(45) Date of Patent: Oct. 14, 2025

(54) RESOURCE CONFIGURATION METHOD AND APPARATUS, COMMUNICATION DEVICE AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 461 days.

(21) Appl. No.: 17/792,845

(22) PCT Filed: Jan. 15, 2020

(86) PCT No.: PCT/CN2020/072268
§ 371 (c)(1),
(2) Date: Jul. 14, 2022

(87) PCT Pub. No.: WO2021/142662
PCT Pub. Date: Jul. 22, 2021

(65) Prior Publication Data
US 2023/0040331 A1    Feb. 9, 2023

(51) Int. Cl.
*H04W 52/36* (2009.01)
*H04W 52/24* (2009.01)

(52) U.S. Cl.
CPC ....... *H04W 52/367* (2013.01); *H04W 52/245* (2013.01)

(58) Field of Classification Search
CPC ............ H04W 52/241; H04W 52/245; H04W 52/367
See application file for complete search history.

(56) References Cited

U.S. PATENT DOCUMENTS

| | | | |
|---|---|---|---|
| 2011/0319112 A1 | 12/2011 | Jeong et al. | |
| 2013/0100933 A1* | 4/2013 | Kim | H04W 72/51 370/335 |
| 2016/0337981 A1* | 11/2016 | Dhakal | H04B 17/309 |
| 2018/0014251 A1 | 1/2018 | Sambhwani et al. | |
| 2018/0097599 A1 | 4/2018 | Lee et al. | |
| 2018/0317180 A1 | 11/2018 | Li et al. | |
| 2019/0059052 A1 | 2/2019 | Nord et al. | |
| 2019/0261289 A1* | 8/2019 | Raghavan | H04W 52/367 |
| 2022/0006507 A1* | 1/2022 | Guan | H04B 7/0695 |
| 2022/0116891 A1* | 4/2022 | Yao | H04W 52/42 |

FOREIGN PATENT DOCUMENTS

| | | |
|---|---|---|
| CN | 102498742 A | 6/2012 |
| CN | 105517011 A | 4/2016 |
| CN | 105873213 A | 8/2016 |
| WO | 2018/144936 A1 | 8/2018 |
| WO | 2019/201036 A1 | 10/2019 |
| WO | 2019/213963 A1 | 11/2019 |

OTHER PUBLICATIONS

Huawei et al. "Further views on Rel-17 NR Light work area", 3GPP TSG RAN Meeting #85 RP-191832, Sep. 9, 2019, entire document.

* cited by examiner

*Primary Examiner* — Nguyen T Vo
(74) *Attorney, Agent, or Firm* — Volpe Koenig

(57) ABSTRACT

A resource configuration method includes: receiving power indication information reported by user equipment; and configuring, for the user equipment, a coverage compensation resource used when performing data transmission on the basis of a target maximum power level according to the target maximum power level indicated by the power indication information.

18 Claims, 5 Drawing Sheets

RESOURCE CONFIGURATION METHOD AND APPARATUS, COMMUNICATION DEVICE AND STORAGE MEDIUM

CROSS REFERENCE

The present application is a U.S. National Stage of International Application No. PCT/CN2020/072268, filed on Jan. 15, 2020, the contents of all of which are incorporated herein by reference in their entireties for all purposes.

BACKGROUND

A new radio light (NR light) technology is used to support high-end wearable devices as well as an industrial Internet of Things camera or sensor. New radio light occupies a bandwidth of 10 MHz or 20 MHz, and can provide a data throughout of a downlink of 100 Mbps and an uplink of 50 Mbps.

New radio light user equipment (UE) does not have a high demand for real-time communication, and a communication data volume is small; but the new radio light user equipment has a relatively high demand for stand-by duration.

SUMMARY

According to a first aspect of examples of the disclosure, a resource configuration method is provided, is applied to a base station, and includes:
  receiving power indication information reported by user equipment; and
  configuring, for the user equipment, a coverage compensation resource used when performing data transmission on the basis of a target maximum power level according to the target maximum power level indicated by the power indication information.

According to a second aspect of examples of the disclosure, a resource configuration method is provided, and is applied to user equipment. At least two maximum power levels are configured in the user equipment, and the method includes:
  reporting, to a base station, power indication information used to indicate a target maximum power level in the at least two maximum power levels.

The target maximum power level is used for the base station to configure, for the user equipment, a coverage compensation resource used when performing data transmission on the basis of the target maximum power level.

According to a third aspect of examples of the disclosure, a communication device is provided and includes a processor, a transceiver, a memory and an executable program stored on the memory and capable of being run by the processor. The processor, in response to running the executable program, executes steps of the resource configuration method according to the first aspect or the second aspect.

According to a fourth aspect of examples of the disclosure, a non-transitory storage medium is provided and stores an executable program. The executable program, in response to being executed by a processor, implements steps of the resource configuration method according to the first aspect or the second aspect.

It should be understood that both the foregoing general description and the following detailed description are used as examples and are explanatory merely, without any limitation to the examples of the disclosure.

BRIEF DESCRIPTION OF THE DRAWINGS

The accompanying drawings, which are incorporated in and constitute a part of this specification, illustrate examples consistent with the disclosure, and together with the description serve to explain the principles of the examples of the disclosure.

DETAILED DESCRIPTION

Examples will be described in detail herein, instances of which are illustrated in the accompanying drawings. When the following description refers to the accompanying drawings, the same numerals in different accompanying drawings refer to the same or similar elements unless otherwise indicated. The implementations described in the following examples do not represent all implementations consistent with examples of the disclosure. Rather, they are merely instances of apparatus and methods consistent with some aspects of the examples of the disclosure as recited in the appended claims.

Terms used in the examples of the disclosure are for the purpose of describing particular examples merely, and are not intended to limit the examples of the disclosure. Singular forms "a", "the", and "said" used in the examples of the disclosure and the appended claims are intended to include plural forms as well, unless the context clearly dictates otherwise. It should also be understood that the term "and/or" used herein refers to and includes any and all possible combinations of one or more associated listed items.

It should be understood that although the terms first, second, third, etc. may be used in examples of the disclosure to describe various information, and such information should not be limited to these terms. These terms are merely used to distinguish the same type of information from each other. For instance, without departing from the scope of the examples of the disclosure, first information may also be referred to as second information, and similarly, the second information may also be referred to as the first information. Depending on the context, the word "if" used herein can be interpreted as "at the time of" or "when" or "in response to determining".

Figure 1:
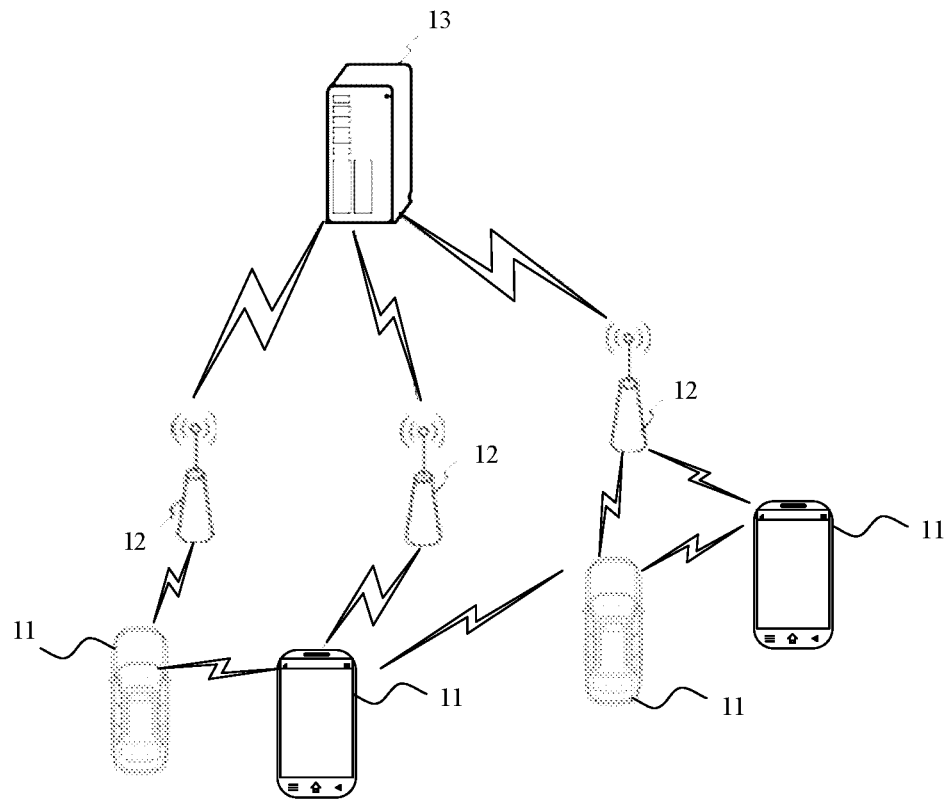
FIG. 1 is a schematic structural diagram of a wireless communication system illustrated according to an example.

Please refer to FIG. 1, which shows a schematic structural diagram of a wireless communication system provided by an example of the disclosure. As shown in FIG. 1, the wireless communication system is a communication system based on a cellular mobile communication technology, and the wireless communication system may include: a plurality of terminals 11 and a plurality of base stations 12.

Each terminal 11 may refer to a device that provides voice and/or data connectivity to a user. The terminal 11 may communicate with one or more core networks via a Radio Access Network (RAN), and the terminal 11 may be an Internet of Thing terminal, such as a sensor device, a mobile phone (or called a "cellular" phone) and a computer with the Internet of Thing terminal, for instance, may be fixed, portable, pocket-sized, hand-held, computer-built or vehicle-mounted apparatuses. For instance, the terminal may be a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicle-mounted device, for instance, a trip computer with a wireless communication function, or a wireless communication device externally connected to the trip computer. Alternatively, the terminal 11 may also be a roadside device, for instance, may be a streetlight, a signal light, or other roadside devices with the wireless communication function.

Each base station 12 may be a network-side device in the wireless communication system. The wireless communication system may be the 4th generation mobile communication (4G) system, also known as a Long Term Evolution (LTE) system; alternatively, the wireless communication system may also be a 5G system, also known as a new radio (NR) system or a 5G NR system. Alternatively, the wireless communication system may also be a next-generation system of the 5G system. An access network in the 5G system may be called a New Generation-Radio Access Network (NG-RAN), or an MTC system.

The base station 12 may be an evolved base station (eNB) used in the 4G system. Alternatively, the base station 12 may also be a base station (gNB) that adopts a centralized distributed architecture in the 5G system. When the base station 12 adopts the centralized distributed architecture, it usually includes a central unit (CU) and at least two distributed units (DUs). The central unit is provided with a protocol stack of a Packet Data Convergence Protocol (PDCP) layer, a Radio Link Control (RLC) protocol layer, and a Media Access Control (MAC) layer; and the distributed unit is provided with a Physical (PHY) layer protocol stack. The specific implementation of the base station 12 is not limited in the example of the disclosure.

A wireless connection may be established between the base station 12 and the terminal 11 through a wireless air interface. In different implementations, the wireless air interface is a wireless air interface based on a 4th generation mobile communication network technology (4G) standard; alternatively, the wireless air interface is a wireless air interface based on a 5th generation mobile communication network technology (5G) standard, for instance, the wireless air interface is a new radio; alternatively, the wireless air interface may also be a wireless air interface based on a next generation mobile communication network technology standard of 5G.

In some examples, an End to End (E2E) connection may also be established between the terminals 11, for instance, vehicle to vehicle (V2V) communication, vehicle to infrastructure (V2I) communication, vehicle to pedestrian (V2P) communication and other scenarios in vehicle to everything (V2X) communication.

In some examples, the above wireless communication system may further include a network management device 13.

The plurality of base stations 12 are respectively connected with the network management device 13. The network management device 13 may be a core network device in the wireless communication system. For instance, the network management device 13 may be a Mobility Management Entity (MME) in an Evolved Packet Core (EPC) network. Alternatively, the network management device may also be other core network devices, such as a Serving GateWay (SGW), a Public Data Network GateWay (PGW), a Policy and Charging Rules Function (PCRF) or a Home Subscriber Server (HSS). An implementation form of the network management device 13 is not limited in the example of the disclosure.

Executive bodies involved in the examples of the disclosure include but are not limited to: user equipment and base stations communicating using a new radio light technology.

An application scenario of the examples of the disclosure is that, new radio light user equipment (UE) does not have a high demand for real-time communication and a communication data volume is small; but the new radio light user equipment has a relatively high demand for stand-by duration.

The present disclosure relates to the technical field of wireless communication but is not limited to the technical field of wireless communication, in particular to a resource configuration method and apparatus, a communication device and a storage medium.

Figure 2:
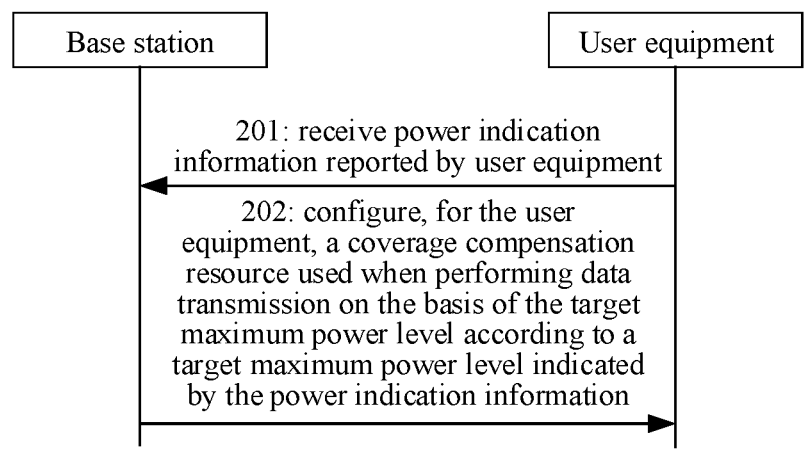
FIG. 2 is a schematic flow chart of a resource configuration method illustrated according to an example.

As shown in FIG. 2, an example provides a resource configuration method. The method may be applied to a base station in wireless communication, and includes:

Step 201: power indication information reported by user equipment is received; and Step 202: a coverage compensation resource used when performing data transmission on the basis of a target maximum power level is configured for the user equipment according to the target maximum power level indicated by the power indication information.

Here, the base station includes but is not limited to a base station performing communication by using a new radio light technology, and the user equipment includes but is not limited to a terminal, a wearable device and an Internet of Things communication device performing communication by using the new radio light technology.

The user equipment may have a plurality of candidate maximum power levels. For instance, the user equipment may have two candidate maximum power levels, representing two maximum powers of 23 dbm and 20 dbm, respectively. Here, under the condition that the user equipment selects one candidate maximum power level for data transmission, that is, maximum power for data transmission is determined, the user equipment may perform the data transmission with power less than or equal to the maximum power.

The user equipment may select a target maximum power level adapted to a current scenario from the candidate maximum power levels according to a current communication scenario. The target maximum power level requested by the user equipment is reported to the base station through the power indication information. Here, the current communication scenario may be a new radio light working scenario, for instance, a working scenario of a medium-load Internet of Things device. The medium-load Internet of Things device may be a communication device whose communication data volume is less than or equal to a data volume threshold, and whose power consumption requirement is less than or equal to a power consumption threshold. In this scenario, the communication data volume of the Internet of Things device is small, and long standby time is needed. As a result, the Internet of Things device needs to reduce power consumption and use lower maximum power levels. The coverage compensation resource may be a transmission resource used for the data transmission between the base station and the user equipment, or may be an additionally configured repeated transmission resource for improving transmission reliability. The base station may be provided with coverage compensation resource configurations corresponding to different maximum power levels, i.e. has different coverage compensation solutions for different maximum power levels. For instance: for a power level with relatively small maximum power, more repeated transmission resources may be configured, so that in a transmission process, in response to determining that a data error exists due to insufficient transmission power, compensation may be performed through repeated transmission. The transmission resource may include a frequency domain resource, a time domain resource and a space domain resource.

After receiving the power indication information indicating the target maximum power level, the base station may configure the coverage compensation resource corresponding to the target maximum power level for the user equipment. The coverage compensation resource may enable the user equipment to ensure the transmission quality when performing the data transmission by using transmission power corresponding to the target maximum power level. For instance, more repeated transmission opportunities may be provided by increasing the repeated transmission resource, so as to ensure that a data receiver may receive accurate data.

In this way, on the one hand, the user equipment may indicate the target maximum power level through the power indication information and then may perform the data transmission by selecting the corresponding maximum power level according to business or scenario demands, so as to improve flexibility in selection of the maximum power level. On the other hand, the base station configures the corresponding coverage compensation resource according to the target maximum power level indicated by the user equipment, and realizes data transmission under different maximum power levels, so that reliability of data transmission on the basis of different maximum power levels is ensured.

In an example, step 201 may include the power indication information reported by the user equipment when switching to a maximum power level is received.

The base station may merely allow user equipment of one maximum power level to perform initial access. For instance, the base station merely allows user equipment of maximum power of 23 dbm indicated by the maximum power level to access. In this way, when initially accessing the base station, the user equipment may perform initial access by using a maximum power level allowed by the base station to use.

After completing initial access, the user equipment may switch the power level based on the working scenario, select a target maximum power level for a current scenario from the plurality of candidate maximum power levels, and indicate to the base station the target maximum power level to be adopted through the power indication information.

Power corresponding to the target maximum power level indicated by the power indication information may be lower than the power corresponding to the maximum power level upon initial access.

In response to determining that the transmission data volume is smaller than or equal to the data volume threshold and that target power consumption of the user equipment is smaller than or equal to the power consumption threshold, the user equipment may switch from a currently used maximum power level upon initial access to the target maximum power level for the current scenario. The base station may configure a corresponding coverage compensation resource according to the target maximum power level for the current scenario, so as to ensure the transmission quality. Here, a scenario that the transmission data volume is smaller than or equal to the data volume threshold and that target power consumption of the user equipment is smaller than or equal to the power consumption threshold may be an application scenario of the medium-load Internet of Things where a communication data volume of the Internet of Things device is relatively small, and relatively long standby time is needed.

In this way, the user equipment may perform the data transmission by selecting the power level with relatively small maximum power according to the business or scenario demands, so power consumption is lowered, and electric quantity is saved.

In an example, the resource configuration method may further include: a measurement report reported by the user equipment is received.

Step 202 may include: in response to determining according to the measurement report that the user equipment can perform the data transmission by using the target maximum power level, the coverage compensation resource used when performing the data transmission on the basis of the target maximum power level is configured for the user equipment.

The user equipment may measure a wireless signal of a current base station, and report the measurement report obtained through measurement to the base station. The measurement report may include: parameters such as a strength of the wireless signal and/or a signal-to-noise ratio of the wireless signal.

Here, the base station may evaluate a signal coverage condition of the user equipment through the measurement report. Whether to allow the user equipment to switch to the target maximum power level indicated by the power indication information is determined according to the evaluation.

For instance, in response to determining that the target maximum power level indicated by the power indication information is lower than the currently used maximum power level and that the measurement report reflects that the signal coverage condition of the user equipment is relatively good, through evaluation, after the user equipment switches to the target maximum power level indicated by the power indication information, in response to determining that the signal coverage condition still supports communication, the user equipment is configured with the coverage compensation resource corresponding to the target maximum power level indicated by the power indication information. The coverage compensation resource for the target maximum power level indicated by the power indication information may be a frequency band resource with lower interference, or may be a transmission resource with repetition times, or the like.

After determining that the user equipment switch to the target maximum power level indicated by the power indication information according to the measurement report, in response to the signal coverage condition fails to support communication between the base station and the user equipment, the user equipment is not configured with the coverage compensation resource corresponding to the target maximum power level indicated by the power indication information.

In an example, the resource configuration method may further include in response to determining according to the measurement report that the user equipment, performing the data transmission by using the target maximum power level, power switching indication information indicating to switch to the target maximum power level is sent.

After the base station determines that the user equipment may switch to the target maximum power level indicated by the power indication information, it may send the switching indication information to indicate the user equipment to perform power level switching. The switching indication information may be sent after completing configuration of the coverage compensation resource, or may be sent before configuring the coverage compensation resource.

After receiving the switching indication information, the user equipment may perform the data transmission by switching to the target maximum power level indicated by the power indication information.

For instance, the switching indication information may be recognition information fed back by the base station. After determining according to the measurement report that the user equipment can perform the data transmission by using the target maximum power level, the base station sends the recognition information, representing consent to that the user equipment may use the target maximum power level indicated by the power indication information.

After the base station determines according to the measurement report that the user equipment cannot perform the data transmission by using the target maximum power level, the base station may further send denial information to reject that the user equipment uses the target maximum power level indicated by the power indication information.

In an example, the power switching indication information further includes transmission resource information, and the transmission resource information is used to indicate the coverage compensation resource.

The base station may send the coverage compensation resource configured for the user equipment according to the target maximum power level indicated by the power indication information to the user equipment through the transmission resource information.

After receiving the power switching indication information indicating to switch to the target maximum power level, the user equipment may confirm whether the base station configures the coverage compensation resource. In response to determining that the base station configures the coverage compensation resource, after receiving the transmission resource information, the user equipment may perform the data transmission by using the coverage compensation resource indicated by the transmission resource information.

In an example, sending the power switching indication information indicating to switch to the target maximum power level includes a RRC command including the power switching indication information is sent.

The base station may indicate, through the RRC command, the user equipment to perform the data transmission by switching to the target maximum power level indicated by the power indication information. It may set an indication bit in the RRC command to indicate the user equipment to perform the data transmission by switching to the target maximum power level indicated by the power indication information, and indicate, through the RRC command, the coverage compensation resource used by the user equipment after switching to the target maximum power level indicated by the power indication information.

In an example, the coverage compensation resource may include at least one of: a repeated transmission time domain resource; a repeated transmission frequency domain resource; a repeated transmission space domain resource; a transmission bandwidth resource; or a transmission frequency domain location.

The base station may set the corresponding coverage compensation resource for each candidate maximum power level in advance.

For instance, in response to determining that the target maximum power level indicated by the power indication information is relatively low, more repeated transmission resources may be configured for the target maximum power level indicated by the power indication information, so that in a transmission process, in response to determining that a data error exists due to insufficient transmission power, compensation may be performed through repeated transmission. The repeated transmission resource may include a frequency domain resource, a time domain resource and a space domain resource. The space domain resource may be a space domain resource occupied by a beam when a beam forming technology is used.

In response to determining that the target maximum power level indicated by the power indication information is relatively low, a frequency domain location with less interference may also be configured for the target maximum power level indicated by the power indication information. For instance, for five carriers with a 20 M bandwidth that the base station has, the base station may configure a higher frequency carrier for user equipment with a higher power level. For the user equipment using the target maximum power level indicated by the power indication information, a 20 M bandwidth at an intermediate frequency may be allocated. In this way, an influence of out-of-band radiation may be reduced, external interference may be reduced, and a success rate of data transmission in the case of lower power may be improved.

The base station may also configure different transmission bandwidths for different maximum power levels so as to adapt to transmission demands.

In this way, different coverage compensation resources are configured for different maximum power levels, so as to improve the reliability of the data transmission.

Figure 3:
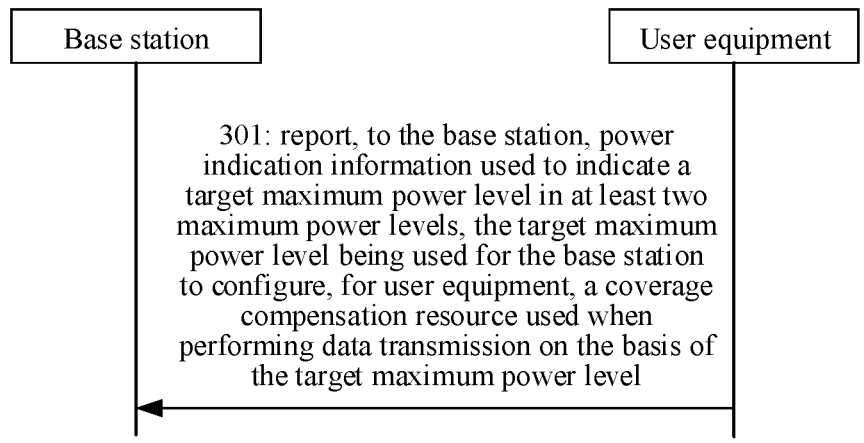
FIG. 3 is a schematic flow chart of another resource configuration method illustrated according to an example.

As shown in FIG. 3, an example of the disclosure provides a resource configuration method. The method may be applied to user equipment, at least two maximum power levels are configured in the user equipment, and the method includes Step 301. Step 301 includes power indication information used to indicate a target maximum power level in the at least two maximum power levels is reported to a base station.

The target maximum power level is used for the base station to configure, for the user equipment, a coverage compensation resource used when performing data transmission on the basis of the target maximum power level.

Here, the base station includes but is not limited to a base station performing communication by using a new radio light technology, and the user equipment includes but is not limited to a terminal, a wearable device and an Internet of Things communication device performing communication by using the new radio light technology.

The user equipment may have a plurality of candidate maximum power levels. For instance, the user equipment may have two candidate maximum power levels, representing two maximum powers of 23 dbm and 20 dbm, respectively. Here, under the condition that the user equipment selects one candidate maximum power level for data transmission, that is, maximum power for data transmission is determined, the user equipment may perform the data transmission with power less than or equal to the maximum power.

The user equipment may select a target maximum power level adapted to a current scenario from the candidate maximum power levels according to a current communication scenario. The target maximum power level requested by the user equipment is reported to the base station through the power indication information. Here, the current communication scenario may be a new radio light working scenario, for instance, a working scenario of a medium-load Internet of Things device. The medium-load Internet of Things device may be a communication device whose communication data volume is less than or equal to a data volume threshold, and whose power consumption requirement is less than or equal to a power consumption threshold. In this scenario, the communication data volume of the Internet of Things device is small, and long standby time is needed. As a result, the Internet of Things device needs to reduce power consumption and use lower maximum power levels.

The coverage compensation resource may be a transmission resource used for the data transmission between the base station and the user equipment, or may be an additionally configured repeated transmission resource for improving transmission reliability. The base station may be provided with coverage compensation resource configurations corresponding to different maximum power levels, i.e. has different coverage compensation solutions for different maximum power levels. For instance: for a power level with relatively small maximum power, more repeated transmission resources may be configured, so that in a transmission process, in response to determining that a data error exists due to insufficient transmission power, compensation may be performed through repeated transmission. The transmission resource may include a frequency domain resource, a time domain resource and a space domain resource.

After receiving the power indication information indicating the target maximum power level, the base station may configure the coverage compensation resource corresponding to the target maximum power level for the user equipment. The coverage compensation resource may enable the user equipment to ensure the transmission quality when performing the data transmission by using transmission power corresponding to the target maximum power level. For instance, more repeated transmission opportunities may be provided by increasing the repeated transmission resource, so as to ensure that a data receiver may receive accurate data.

In this way, on the one hand, the user equipment may indicate the target maximum power level through the power indication information and then may perform the data transmission by selecting the corresponding maximum power level according to business or scenario demands, so as to improve flexibility in selection of the maximum power level. On the other hand, the base station configures the corresponding coverage compensation resource according to the target maximum power level indicated by the user equipment, and realizes data transmission under different maximum power levels, so that reliability of data transmission on the basis of different maximum power levels is ensured.

In an example, step 301 may include the power indication information used to indicate the target maximum power level is reported to the base station when performing switching of the maximum power level.

The base station may merely allow user equipment of one maximum power level to perform initial access. For instance, the base station merely allows user equipment of maximum power of 23 dbm indicated by the maximum power level to access. In this way, when initially accessing the base station, the user equipment may perform initial access by using a maximum power level allowed by the base station to use.

After completing initial access, the user equipment may switch the power level based on the working scenario, select a target maximum power level for a current scenario from the plurality of candidate maximum power levels, and indicate to the base station the target maximum power level to be adopted through the power indication information.

Power corresponding to the target maximum power level indicated by the power indication information may be lower than the power corresponding to the maximum power level upon initial access.

In response to determining that the transmission data volume is smaller than or equal to the data volume threshold and that target power consumption of the user equipment is smaller than or equal to the power consumption threshold, the user equipment may switch from a currently used maximum power level upon initial access to the target maximum power level for the current scenario. The base station may configure a corresponding coverage compensation resource according to the target maximum power level for the current scenario, so as to ensure the transmission quality. Here, a scenario that the transmission data volume is smaller than or equal to the data volume threshold and that target power consumption of the user equipment is smaller than or equal to the power consumption threshold may be an application scenario of the medium-load Internet of Things device where a communication data volume of the Internet of Things device is relatively small, and relatively long standby time is needed.

In this way, the user equipment may perform the data transmission by selecting the power level with relatively small maximum power according to the business or scenario demands, so power consumption is lowered, and electric quantity is saved.

Figure 4:
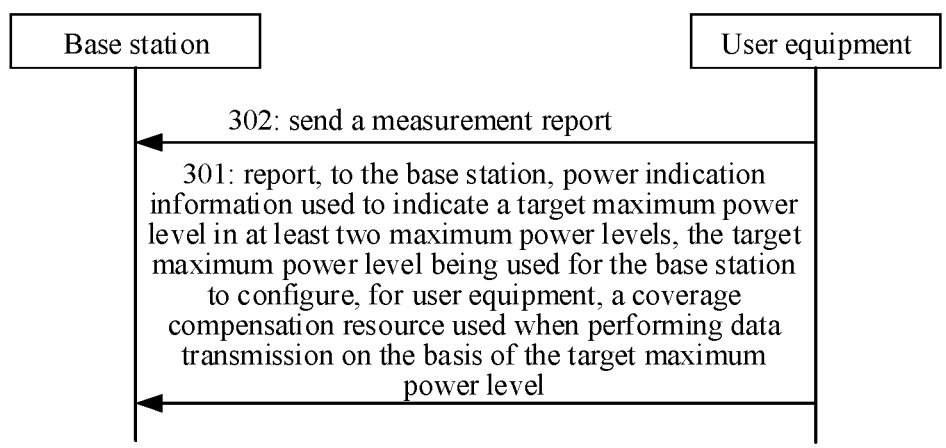
FIG. 4 is a schematic flow chart of yet another resource configuration method illustrated according to an example.

In an example, as shown in FIG. 4, the resource configuration method further includes Step 302: a measurement report is sent.

The measurement report is used for the base station to determine whether the user equipment can perform the data transmission by using the target maximum power level.

The user equipment may measure a wireless signal of a current base station, and report the measurement report obtained through measurement to the base station. The measurement report may include: parameters such as a strength of the wireless signal and/or a signal-to-noise ratio of the wireless signal.

Here, the base station may evaluate a signal coverage condition of the user equipment through the measurement report. Whether to allow the user equipment to switch to the target maximum power level indicated by the power indication information is determined according to the evaluation.

For instance, in response to determining that the target maximum power level indicated by the power indication information is lower than the currently used maximum power level and that the measurement report reflects that the signal coverage condition of the user equipment is relatively good, through evaluation, after the user equipment switches to the target maximum power level indicated by the power indication information, in response to determining that the signal coverage condition still supports communication, the user equipment is configured with the coverage compensation resource corresponding to the target maximum power level indicated by the power indication information. The coverage compensation resource for the target maximum power level indicated by the power indication information may be a frequency band resource with lower interference, or may be a transmission resource with repetition times, or the like.

After determining that the user equipment switch to the target maximum power level indicated by the power indication information according to the measurement report, in response to the signal coverage condition fails to support communication between the base station and the user equipment, the user equipment is not configured with the coverage compensation resource corresponding to the target maximum power level indicated by the power indication information.

In an example, the resource configuration method further includes:

power switching indication information indicating to switch to the target maximum power level is received;

the target maximum power level is switch according to the power switching indication information; and data transmission is performed on the basis of the target maximum power level.

After the base station determines that the user equipment may switch to the target maximum power level indicated by the power indication information, it may send the switching indication information to indicate the user equipment to perform power level switching. The switching indication information may be sent after completing configuration of the coverage compensation resource, or may be sent before configuring the coverage compensation resource.

After receiving the switching indication information, the user equipment may perform the data transmission by switching to the target maximum power level indicated by the power indication information.

For instance, the switching indication information may be recognition information fed back by the base station. After determining according to the measurement report that the user equipment can perform the data transmission by using the target maximum power level, the base station sends the recognition information, representing consent to that the user equipment may use the target maximum power level indicated by the power indication information.

After the base station determines according to the measurement report that the user equipment cannot perform the data transmission by using the target maximum power level, the base station may further send denial information to reject that the user equipment uses the target maximum power level indicated by the power indication information.

In an example, the power switching indication information includes transmission resource information, and the transmission resource information is used to indicate the coverage compensation resource.

Performing the data transmission on the basis of the target maximum power level includes the data transmission being performed by using the coverage compensation resource indicated by the transmission resource information on the basis of the target maximum power level.

The base station may send the coverage compensation resource configured for the user equipment according to the target maximum power level indicated by the power indication information to the user equipment through the transmission resource information.

After receiving the power switching indication information indicating to switch to the target maximum power level, the user equipment may confirm whether the base station configures the coverage compensation resource. In response to determining that the base station configures the coverage compensation resource, after receiving the transmission resource information, the user equipment may perform the data transmission by using the coverage compensation resource indicated by the transmission resource information.

In an example, receiving the power switching indication information indicating to switch to the target maximum power level includes a RRC command is received. The RRC command includes the power switching indication information.

The base station may indicate, through the RRC command, the user equipment to perform the data transmission by switching to the target maximum power level indicated by the power indication information. It may set an indication bit in the RRC command to indicate the user equipment to perform the data transmission by switching to the target maximum power level indicated by the power indication information, and indicate, through the RRC command, the coverage compensation resource used by the user equipment after switching to the target maximum power level indicated by the power indication information.

In an example, the coverage compensation resource includes at least one of: a repeated transmission time domain resource; a repeated transmission frequency domain resource; a repeated transmission space domain resource; a transmission bandwidth resource; or a transmission frequency domain location.

The base station may set the corresponding coverage compensation resource for each candidate maximum power level in advance.

For instance, in response to determining that the target maximum power level indicated by the power indication information is relatively low, more repeated transmission resources may be configured for the target maximum power level indicated by the power indication information, so that in a transmission process, in response to determining that a data error exists due to insufficient transmission power, compensation may be performed through repeated transmission. The repeated transmission resource may include a frequency domain resource, a time domain resource and a space domain resource. The space domain resource may be a space domain resource occupied by a beam when a beam forming technology is used.

In response to determining that the target maximum power level indicated by the power indication information is relatively low, a frequency domain location with less interference may also be configured for the target maximum power level indicated by the power indication information. For instance, for five carriers with a 20 M bandwidth that the base station has, the base station may configure a higher frequency carrier for user equipment with a higher power level. For the user equipment using the target maximum power level indicated by the power indication information, a 20 M bandwidth at an intermediate frequency may be allocated. In this way, an influence of out-of-band radiation may be reduced, external interference may be reduced, and a success rate of data transmission in the case of lower power may be improved.

The base station may also configure different transmission bandwidths for different maximum power levels so as to adapt to transmission demands.

In this way, different coverage compensation resources are configured for different maximum power levels, so as to improve the reliability of the data transmission.

One specific instance is provided below in combination with any one of the above examples:

The resource configuration method provided by the example may support different coverage compensation solutions for user equipment of specific types. For instance, different coverage compensation solutions are adopted for new radio light user equipment. Different coverage compensation solutions are adopted for different maximum power levels of the user equipment. Here, the coverage compensation solutions refer to allocating different transmission resources for different power levels.

Different types of user equipment with different power levels are allowed to work simultaneously in the same communication system.

The coverage compensation solutions may include: different transmission resources are configured for different power levels. For instance, for different user equipment power levels, repetition of different symbol numbers in a time domain, and/or different frequency domain positions, and/or different bandwidths, and/or different repetitions in a frequency domain are configured.

According to the above different coverage compensation solutions, a concept of coverage compensation levels is introduced, and different power levels correspond to different configuration indexes. The communication system supports fallback of the user equipment from the maximum power level.

The user equipment may support a plurality of maximum power levels, e.g., may support two maximum power levels. The user equipment may report a change of the maximum power level under a condition that a network allows.

Figure 5:
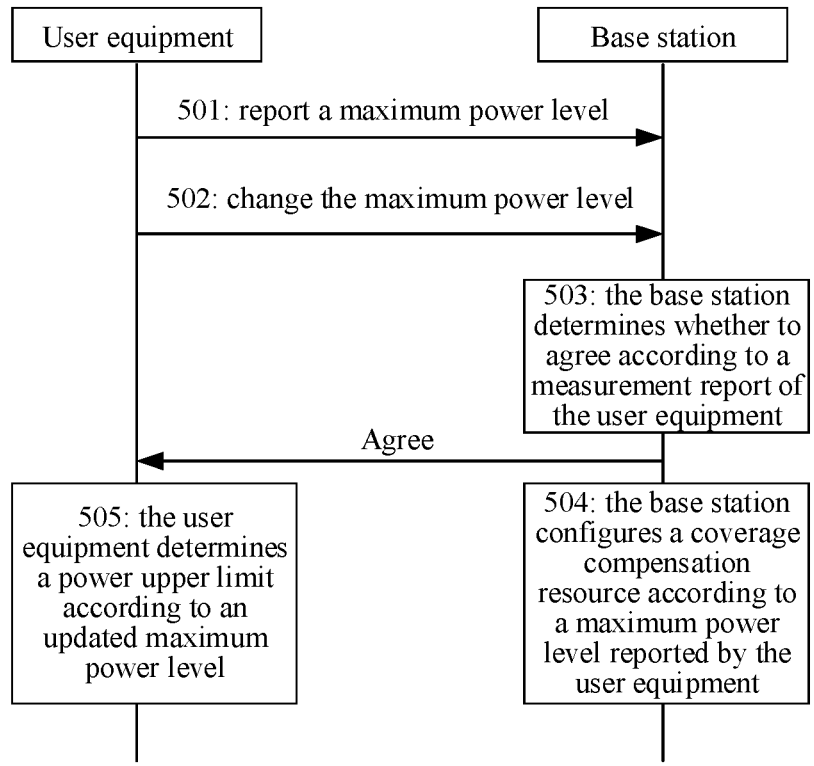
FIG. 5 is a schematic diagram of information interaction of a resource configuration method illustrated according to an example.

As shown in FIG. 5, specific steps of the user equipment changing the maximum power level may include:

Step 501: the user equipment accesses the base station on the basis of initial access maximum power allowed by the base station.

Step 502: the user equipment may report switching of the maximum power level based on a business scenario.

Step 503: the base station determines whether to consent the user equipment to switch to the maximum power level based on a measurement report of the user equipment.

Step 504: if yes, the base station informs the user equipment of switching to the maximum power level, and configures the corresponding coverage compensation resource. The base station may inform the user equipment of switching before configuring the corresponding coverage compensation resource, or may inform the user equipment of switching after configuring the corresponding coverage compensation resource.

Step 505: the user equipment performs the data transmission based on the power level after switching. The user equipment may perform the data transmission based on the switched power level after receiving the coverage compensation resource configured by the base station.

Figure 6:
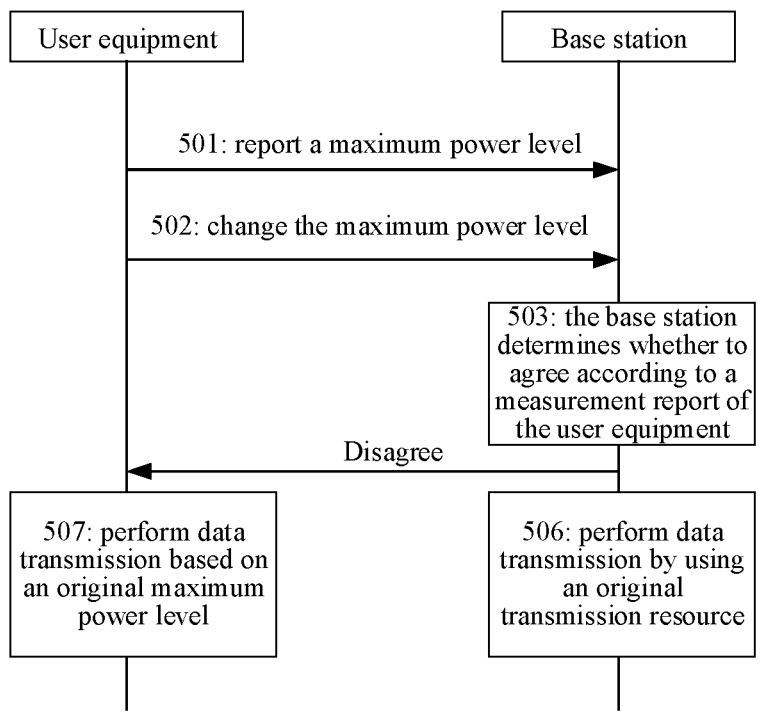
FIG. 6 is a schematic diagram of information interaction of another resource configuration method illustrated according to an example.

Step 506: as shown in FIG. 6, if the base station does not agree on switching the power level, it informs the user equipment of not switching the power level and still performing the data transmission by using an original transmission resource.

Step 507: as shown in FIG. 6, the user equipment performs the data transmission based on an original maximum power level.

Figure 7:
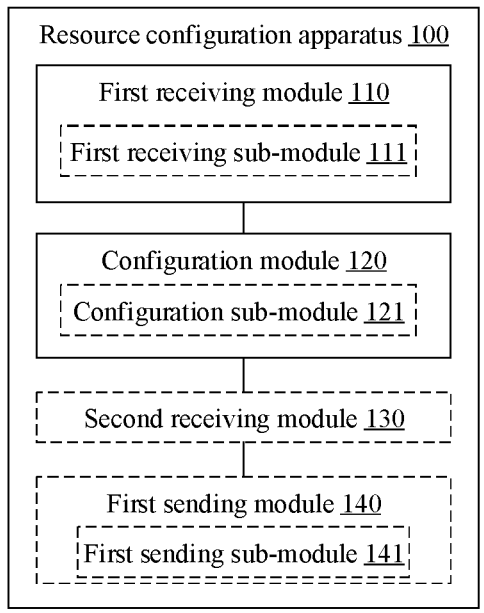
FIG. 7 is a block diagram of a constituent structure of a resource configuration apparatus illustrated according to an example.

An example of the disclosure further provides a resource configuration apparatus, applied to a base station in wireless communication. FIG. 7 is a block diagram of a constituent structure of a resource configuration apparatus 100 illustrated according to an example. As shown in FIG. 7, the apparatus 100 includes: a first receiving module 110 and a configuration module 120.

The first receiving module 110 is configured to receive power indication information reported by user equipment.

The configuration module 120 is configured to configure, for the user equipment, a coverage compensation resource used when performing data transmission on the basis of a target maximum power level according to the target maximum power level indicated by the power indication information.

In an example, the first receiving module 110 includes:
a first receiving sub-module 111, configured to receive the power indication information reported by the user equipment when switching to a maximum power level.

In an example, the apparatus 100 further includes:
a second receiving module 130, configured to receive a measurement report reported by the user equipment.

The configuration module 120 includes:
a configuration sub-module 121, configured to configure, in response to determining according to the measurement report that the user equipment can perform the data transmission by using the target maximum power level, the coverage compensation resource used when performing the data transmission on the basis of the target maximum power level for the user equipment.

In an example, the apparatus 100 further includes:
a first sending module 140, configured to send, in response to determining according to the measurement report that the user equipment can perform the data transmission by using the target maximum power level, power switching indication information indicating to switch to the target maximum power level.

In an example, the power switching indication information further includes: transmission resource information, and the transmission resource information is used to indicate the coverage compensation resource.

In an example, the first sending module 140 includes:
a first sending sub-module 141, configured to send a RRC command including the power switching indication information.

In an example, the coverage compensation resource includes at least one of:
a repeated transmission time domain resource;
a repeated transmission frequency domain resource;
a repeated transmission space domain resource;
a transmission bandwidth resource; or
a transmission frequency domain location.

Figure 8:
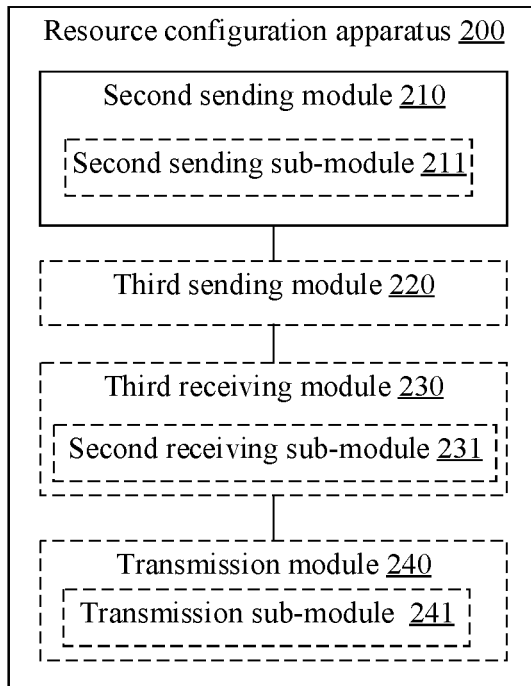
FIG. 8 is a block diagram of a constituent structure of another resource configuration apparatus illustrated according to an example.

An example of the disclosure further provides a resource configuration apparatus, applied to user equipment in wireless communication. At least two maximum power levels are configured in the user equipment. FIG. 8 is a block diagram of a constituent structure of another resource configuration apparatus 200 illustrated according to an example. As shown in FIG. 8, the apparatus 200 includes: a second sending module 210.

The second sending module 210 is configured to report, to a base station, power indication information used to indicate a target maximum power level in the at least two maximum power levels.

The target maximum power level is used for the base station to configure, for the user equipment, a coverage compensation resource used when performing data transmission on the basis of the target maximum power level.

In an example, the second sending module 210 includes:
a second sending sub-module 211, configured to report, to the base station, the power indication information used to indicate the target maximum power level when performing switching of the maximum power level.

In an example, the apparatus 200 further includes:
a third sending module 220, configured to send a measurement report.

The measurement report is used for the base station to determine whether the user equipment can perform the data transmission by using the target maximum power level.

In an example, the apparatus 200 further includes:
a third receiving module 230, configured to receive power switching indication information indicating to switch to the target maximum power level; and
a transmission module 240, configured to switch to the target maximum power level according to the power switching indication information; and perform the data transmission on the basis of the target maximum power level.

In an example, the power switching indication information includes transmission resource information, and the transmission resource information is used to indicate the coverage compensation resource.

The transmission module 240 includes:
a transmission sub-module 241, configured to perform the data transmission by using the coverage compensation resource indicated by the transmission resource information on the basis of the target maximum power level.

In an example, the third receiving module 230 includes:
a second receiving sub-module 231, configured to receive the power switching indication information included in a RRC command.

In an example, the first receiving module 110, the configuration module 120, the second receiving module 130, the first sending module 140, the second sending module 210, the third sending module 220, the third receiving module 230 and the transmission module 240 may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic component to execute the aforementioned method.

Figure 9:
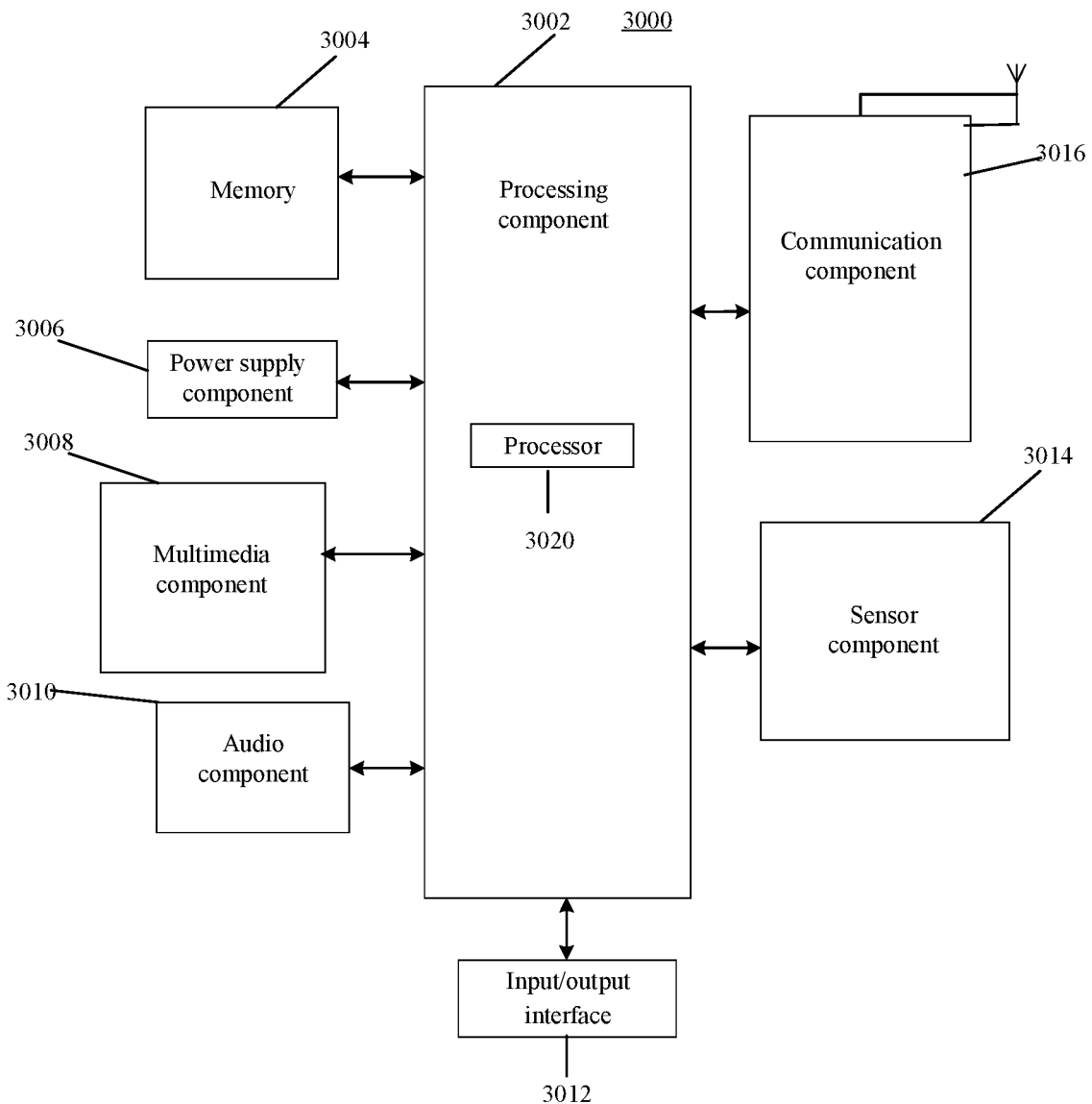
FIG. 9 is a block diagram of an apparatus for resource configuration illustrated according to an example.

FIG. 9 is a block diagram of a resource configuration apparatus 3000 illustrated according to an example of the disclosure. For instance, the apparatus 3000 may be a mobile phone, a computer, a digital broadcasting terminal, a messaging device, a game console, a tablet device, a medical device, a fitness device, a personal digital assistant, etc.

With reference to FIG. 9, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls overall operations of the apparatus 3000, such as operations associated with display, telephone calls, data communication, camera operations, and recording operations. The processing component 3002 may include one or more processors 3020 to execute instructions to complete all or part of steps of the above method. In addition, the processing component 3002 may include one or more modules to facilitate interaction between the processing component 3002 and other components. For instance, the processing component 3002 may include a multimedia module to facilitate interaction between the multimedia component 3008 and the processing component 3002.

The memory 3004 is configured to store various types of data to support operations on the apparatus 3000. Instances of these data include instructions for any application program or method operating on the apparatus 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 provides power to various components of the apparatus 3000. The power supply component 3006 may include a power management system, one or more power supplies, and other components associated with generation, management, and distribution of the power for the apparatus 3000.

The multimedia component 3008 includes a screen that provides an output interface between the apparatus 3000 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, wipe, and gestures on the touch panel. The touch sensor may sense a boundary of a touch or wipe action, and also may detect a duration and pressure related to a touch or wipe operation. In some examples, the multimedia component 3008 includes a front camera and/or a rear camera. When the apparatus 3000 is in an operation mode, such as a shooting mode or a video mode, the front camera and/or the rear camera may receive external multimedia data. Each front camera and rear camera may be a fixed optical lens system or have focal length and optical zoom capabilities.

The audio component 3010 is configured to output and/or input audio signals. For instance, the audio component 3010 includes a microphone (MIC). When the apparatus 3000 is in the operation mode, such as a call mode, a recording mode, and a voice recognition mode, the microphone is configured to receive external audio signals. The received audio signals may be further stored in the memory 3004 or sent via the communication component 3016. In some examples, the audio component 3010 further includes a speaker for outputting audio signals.

The I/O interface 3012 provides an interface between the processing component 3002 and a peripheral interface module. The above peripheral interface module may be a keyboard, a click wheel, buttons, etc. These buttons may include but are not limited to: a home button, a volume button, a start button, and a lock button.

The sensor component 3014 includes one or more sensors to provide the apparatus 3000 with various aspects of status assessment. For instance, the sensor component 3014 may detect an on/off status of the apparatus 3000 and relative positioning of a component. For instance, the component is a display and a keypad of the apparatus 3000. The sensor component 3014 may also detect a position change of the apparatus 3000 or a component of the apparatus 3000, presence or absence of contact between the user and the apparatus 3000, orientation or acceleration/deceleration of the apparatus 3000, and a temperature change of the apparatus 3000. The sensor component 3014 may include a proximity sensor configured to detect presence of a nearby object when there is no physical contact. The sensor component 3014 may also include a light sensor, such as a CMOS or CCD image sensor, for use in imaging applications. In some examples, the sensor component 3014 may also include an acceleration sensor, a gyroscope sensor, a magnetic sensor, a pressure sensor or a temperature sensor.

The communication component 3016 is configured to facilitate wired or wireless communication between the apparatus 3000 and other devices. The apparatus 3000 may access a wireless network based on a communication standard, such as Wi-Fi, 2G or 3G, or their combination. In an example, the communication component 3016 receives a broadcast signal or broadcast related information from an external broadcast management system via a broadcast channel. In an example, the communication component 3016 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, so as to execute the above method.

In an example, a non-transitory computer-readable storage medium including instructions is further provided, for instance, a memory 3004 including instructions. The above instructions may be executed by a processor 3020 of an apparatus 3000 to complete the above method. For instance, the non-transitory computer-readable storage medium may be an ROM, a random access memory (RAM), a CD-ROM, a magnetic tape, a floppy disk, an optical data storage device, etc.

After considering the specification and practicing the disclosure disclosed herein, those of skill in the art will easily think of other implementation solutions of the examples of the disclosure. The disclosure is intended to cover any variations, uses, or adaptive changes of the examples of the disclosure. These variations, uses, or adaptive changes follow the general principles of the disclosure and include common knowledge or conventional technical means in the technical field that are not disclosed in the disclosure. The specification and the examples are to be regarded as examples merely, and the true scope and spirit of the disclosure are pointed out by the appended claims.

It should be understood that the disclosure is not limited to the precise structure that has been described above and shown in the accompanying drawings, and various modifications and changes can be made without departing from its scope. The scope of the disclosure is merely limited by the appended claims.

What is claimed is:

1. A resource configuration method, applied to a base station, comprising:
   receiving power indication information reported by user equipment; and
   configuring, for the user equipment, a coverage compensation resource used when performing data transmission based on a target maximum power level, according to the target maximum power level indicated by the power indication information, wherein
   the coverage compensation resource comprises a transmission frequency domain location, and
   configuring, for the user equipment, the coverage compensation resource used when performing data transmission based on the target maximum power level, according to the target maximum power level indicated by the power indication information comprises:
   configuring the transmission frequency domain location for the target maximum power level, according to the target maximum power level indicated by the power indication information, and
   configuring the transmission frequency domain location for the target maximum power level, according to the target maximum power level indicated by the power indication information comprises:
   configuring a frequency domain location with less interference for a user equipment with a lower target maximum power level, compared with a user equipment with a higher target maximum power level, wherein a power corresponding to the lower target maximum power level is less than a power corresponding to the higher target maximum power level.

2. The method according to claim 1, wherein receiving the power indication information reported by the user equipment comprises:
   receiving the power indication information reported by the user equipment when switching to a maximum power level.

3. The method according to claim 1, further comprising:
   receiving a measurement report reported by the user equipment; and
   configuring, for the user equipment, the coverage compensation resource used when performing the data transmission based on the target maximum power level comprises:
   configuring, in response to determining according to the measurement report that the user equipment can perform the data transmission by using the target maximum power level, the coverage compensation resource used when performing the data transmission based on the target maximum power level for the user equipment.

4. The method according to claim 3, further comprising:
   sending, in response to determining according to the measurement report that the user equipment can perform the data transmission by using the target maximum power level, power switching indication information indicating to switch to the target maximum power level.

5. The method according to claim 4, wherein the power switching indication information further comprises: transmission resource information, and the transmission resource information is used to indicate the coverage compensation resource.

6. The method according to claim 4, wherein sending the power switching indication information indicating to switch to the target maximum power level comprises:
   sending a radio resource control (RRC) command comprising the power switching indication information.

7. The method according to claim 1, wherein the coverage compensation resource comprises at least one of:
   a repeated transmission time domain resource;
   a repeated transmission frequency domain resource;
   a repeated transmission space domain resource; or
   a transmission bandwidth resource.

8. A communication device, comprising: a processor, a transceiver, a memory and an executable program stored on the memory and capable of being run by the processor, wherein the processor, in response to running the executable program, executes steps of the resource configuration method according to claim 1.

9. A non-transitory storage medium, storing an executable program, wherein the executable program, in response to being executed by a processor, implements steps of the resource configuration method according to claim 1.

10. A resource configuration method, applied to user equipment, wherein at least two maximum power levels are configured in the user equipment, and the method comprises:
   reporting, to a base station, power indication information used to indicate a target maximum power level in the at least two maximum power levels, wherein
      the target maximum power level is used for the base station to configure, for the user equipment, a coverage compensation resource used when performing data transmission based on the target maximum power level,
      the coverage compensation resource comprises a transmission frequency domain location configured by the base station for the target maximum power level according to the target maximum power level indicated by the power indication information, and
      the transmission frequency domain location is a frequency domain location with less interference configured by the base station for a user equipment with a lower target maximum power level, compared with a user equipment with a higher target maximum power level; and wherein a power corresponding to the lower target maximum power level is less than a power corresponding to the higher target maximum power level.

11. The method according to claim 10, wherein
reporting, to the base station, the power indication information used to indicate the target maximum power level comprises: reporting, to the base station, the power indication information used to indicate the target maximum power level when performing switching of the maximum power level.

12. The method according to claim 11, further comprising:
   sending a measurement report; wherein
      the measurement report is used for the base station to determine whether the user equipment can perform the data transmission by using the target maximum power level.

13. The method according to claim 10, further comprising:
   sending a measurement report; wherein
      the measurement report is used for the base station to determine whether the user equipment can perform the data transmission by using the target maximum power level.

14. The method according to claim 13, further comprising:
   receiving power switching indication information indicating to switch to the target maximum power level;
   switching to the target maximum power level according to the power switching indication information; and
   performing the data transmission based on the target maximum power level.

15. The method according to claim 14, wherein the power switching indication information comprises transmission resource information, and the transmission resource information is used to indicate the coverage compensation resource; and
   performing the data transmission based on the target maximum power level comprises:
   performing the data transmission by using the coverage compensation resource indicated by the transmission resource information based on the target maximum power level.

16. The method according to claim 14, wherein receiving the power switching indication information indicating to switch to the target maximum power level comprises:
   receiving a radio resource control (RRC) command, wherein the RRC command comprises the power switching indication information.

17. A non-transitory storage medium, storing an executable program, wherein the executable program, in response to being executed by a processor, implements steps of the resource configuration method according to claim 10.

18. A communication device, comprising: a processor, a transceiver, a memory and an executable program stored on the memory and capable of being run by the processor, wherein the processor, in response to running the executable program, executes steps of:
   reporting, to a base station, power indication information used to indicate a target maximum power level in at least two maximum power levels, wherein
      the target maximum power level is used for the base station to configure, for user equipment, a coverage compensation resource used when performing data transmission based on the target maximum power level,
      the coverage compensation resource comprises a transmission frequency domain location configured by the base station for the target maximum power level according to the target maximum power level indicated by the power indication information, and
      the transmission frequency domain location is a frequency domain location with less interference configured by the base station for a user equipment with a lower target maximum power level, compared with a user equipment with a higher target maximum power level; and wherein a power corresponding to the lower target maximum power level is less than a power corresponding to the higher target maximum power level.

\* \* \* \* \*